UNITED STATES PATENT OFFICE.

SIGISMUND MEDVECZKY, OF BUDAPEST, AUSTRIA-HUNGARY.

PROCESS FOR MANUFACTURING MATERIAL FOR CASTING AND PAINTING.

1,012,887. Specification of Letters Patent. Patented Dec. 26, 1911.

No Drawing. Application filed November 15, 1910. Serial No. 592,536.

*To all whom it may concern:*

Be it known that I, SIGISMUND MEDVECZKY, engineer, a subject of the King of Hungary, and residing at 5 Bakácsutca, IX., in the city of Budapest, Empire of Austria-Hungary, have invented certain new and useful Improvements in the Process for Manufacturing Material for Casting and Painting, of which the following is a full, clear, and exact specification.

The subject of the present invention is a process for producing a material which to some extent possesses both the properties of glass and of celloidin or celluloid and in consequence is well adapted for use for many technical and industrial purposes. This material is produced by boiling in a concentrated solution of sodium silicate or potassium silicate or any other salt containing silicic acid which is soluble in water, fresh celloidin which has been cut into small pieces or grated, until the solution has become saturated with the celloidin. The liquid is preferably kept boiling for a short time thereafter and to the solution there is added a metal oxid having a strong affinity to silicic acid and slightly soluble in water, preferably magnesium or lead oxid (PbO) or even calcium oxid according to the hardness of the coating or impregnation desired. It is also preferable to boil with the solution quartz powder so that the free alkalis therein may be chemically bound as far as possible. If desired, any resinous material such as gum copal or kauri gum may be boiled therewith, especially when a high polish is desired. This solution when cold is very suitable for painting or impregnating wood, metal and earthenware articles. The dried coating forms a material which may be designated "celloidin glass" since it has both the properties of glass and of celloidin. If the painted or impregnated articles after drying are coated with or dipped in an alcoholic solution of camphor, preferably of a strength of 10% the celloidin in this solvent becomes converted into celluloid so that finally the coating or impregnation forms a union of glass and celluloid and retains to a certain extent the properties of both. It may be remarked that the viscous liquid so formed can be diluted to some extent with water without the celloidin separating out. If desired, this liquid, by the addition of mineral or other suitable materials and coloring matters can be made into paint and used as such. The preferred proportions are: 1 part of the liquid, 1 part of kaolin, ½ part of a mixture of equal parts of talcum, pumice and fluorspar powder and the necessary quantity of coloring material.

If an increased hardness of the coating or impregnation or of the cast is desired, this is effected by first saturating the coated or impregnated material with or dipping it in a solution in water of a metal oxid or an alkaline earth, such as aluminium, magnesium, barium or calcium oxid, this preliminary treatment being preferably followed by a further treatment with a suitable acid such as siliconhydrofluoric acid, both of these solutions being employed after being very much diluted. The preferred strength of this solution is from 1 to 3%. This treatment substantially increases the hardness of the coating and at the same time causes the alkalis to separate out in such manner that they can be dusted away without leaving a mark.

Such coatings or impregnating materials may be utilized for many purposes while articles can be cast from the solution when sufficiently concentrated, which articles, in consequence of the actions of the celloidin and of the camphor, have in them the properties of glass and of celluloid.

The preferred proportions are the following: 100 parts of a silicate, which is soluble in water, 20 parts of quartz powder, 5 parts of a metal oxid. To the solution of these materials is then added as much fresh celloidin as will dissolve in the solution and from .25 to 1.5 parts of a resinous material.

Having now particularly described and ascertained the nature of my said invention and in what manner the same is to be performed, I declare that what I claim is:—

1. A process for manufacturing a material for casting and painting, said process consisting in boiling fresh celloidin in a concentrated solution of any silicate which is soluble in water, such as sodium or potassium silicate, until the celloidin is dissolved to the greatest possible extent and the liquid becomes quite viscous.

2. A process for manufacturing a material for casting and painting, said process consisting in boiling fresh celloidin in a concentrated solution of a silicate soluble in water, and continuing the boiling until the celloidin is dissolved to the greatest possible extent and the liquid becomes quite viscous.

3. A process for manufacturing a material for casting and painting, said process consisting in boiling fresh celloidin in a concentrated solution of a silicate soluble in water, adding, to the boiling solution, a metal oxid having a strong affinity to silicic acid and which is slightly soluble in water, and continuing the boiling until the celloidin is dissolved to the greatest possible extent and the liquid becomes quite viscous.

4. A process for manufacturing a material for casting and painting, said process consisting in boiling fresh celloidin in a concentrated solution of a silicate soluble in water, adding, to the boiling solution, a metal oxid such as sodium or potassium silicate having a strong affinity to silicic acid and which is slightly soluble in water, and continuing the boiling until the celloidin is dissolved to the greatest possible extent and the liquid becomes quite viscous.

5. A process for manufacturing a material for casting and painting, said process consisting in boiling fresh celloidin in a concentrated solution of a silicate soluble in water, adding, to the boiling solution, a quartz powder, a resinous material and a metal oxid having a strong affinity to silicic acid, and which is slightly soluble in water, and continuing the boiling until the celloidin is dissolved to the greatest possible extent and the liquid becomes quite viscous.

In testimony whereof I have affixed my signature in the presence of two witnesses.

SIGISMUND MEDVECZKY.

Witnesses:
MARTIN HOCNIGER,
HUGH KEMENY.

---

Copies of this patent may be obtained for five cents each, by addressing the "Commissioner of Patents, Washington, D. C."